Feb. 11, 1936.   C. SAUZEDDE   2,030,076
WHEEL
Filed Sept. 30, 1929    2 Sheets-Sheet 1

INVENTOR
Claude Sauzedde.
BY
Harness, Dickey & Pierce
ATTORNEY

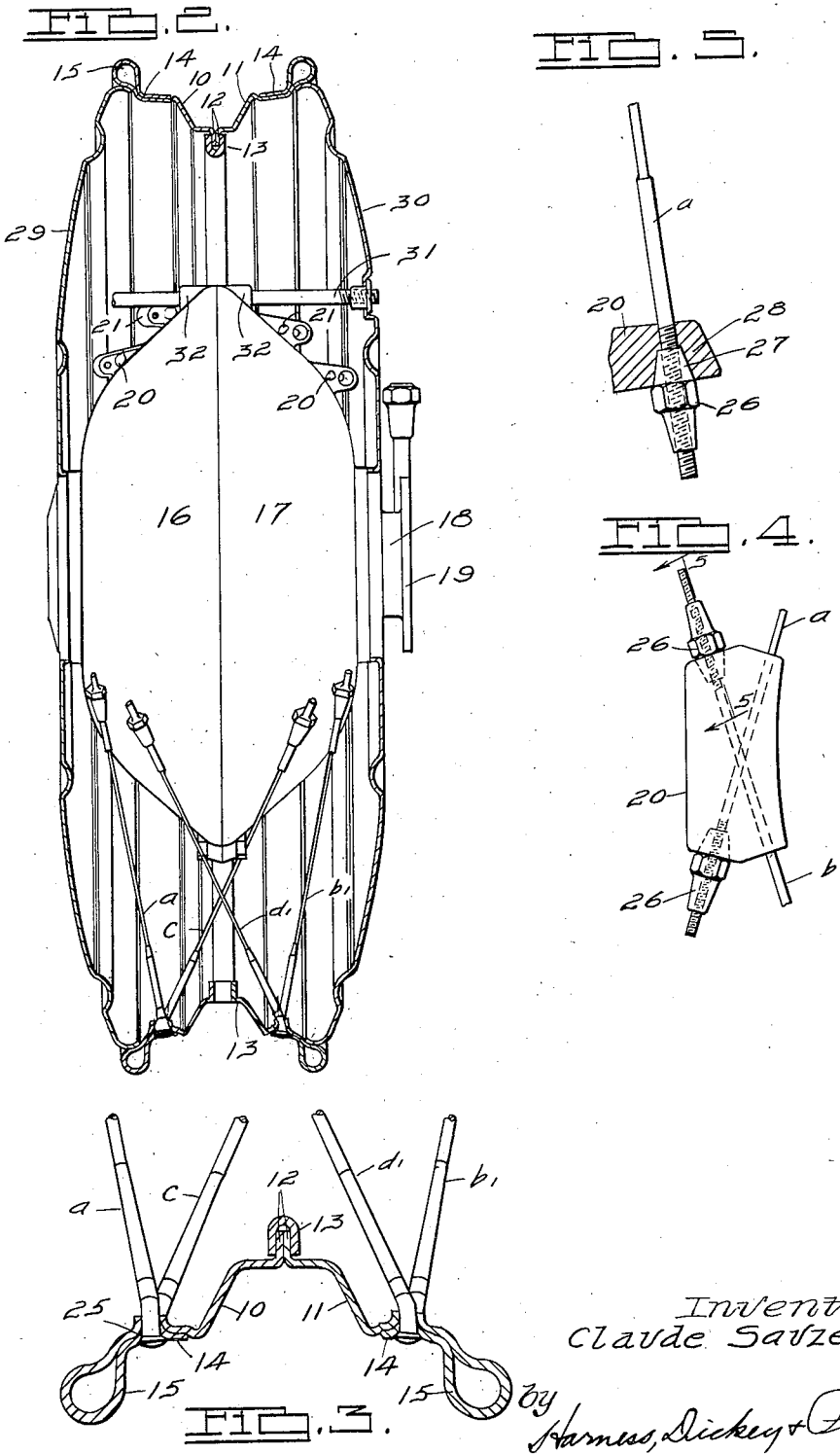

Patented Feb. 11, 1936

2,030,076

UNITED STATES PATENT OFFICE 2,030,076

WHEEL

Claude Sauzedde, Detroit, Mich., assignor to Detroit Hydrostatic Brake Corporation, a corporation of Michigan Application September 30, 1929, Serial No. 396,105

10 Claims. (Cl. 301—55)

This invention relates to wire wheels for motor vehicles, airplanes or the like, the principal object being the provision of a new and novel construction resulting in a wheel of great strength for the relative weight thereof.

Another object is the provision of a new and novel lacing arrangement for the spokes of a wire wheel.

Another object is the provision of a lacing arrangement for the spokes of a wire wheel whereby substantially all of the spokes are subject to the same maximum stress.

Another object is the provision of a novel lacing means for the spokes of wire wheels whereby the majority of the spokes simultaneously act to support the load on the wheel.

Another object is the provision of a novel lacing means for wire wheels whereby the stress distribution is dissipated over not less than 300° of the total circumference of the wheel.

Another object is the provision of a wire wheel that is equally resistant to lateral forces in either direction.

Another object is to provide a wire wheel having four distinct rows of spokes at the hub and but a single row of spokes on each side of the rim.

A further object is to provide a novel means of connecting the spokes of a wire wheel to the hub.

The above being among the objects of the present invention, same consists in certain novel features of construction and combinations of parts to be hereinafter described with reference to the accompanying drawings, and then claimed, having the above and other objects in view.

In the accompanying drawings, which illustrate the suitable embodiment of the present invention, and in which like numerals refer to like parts throughout the several different views, Fig. 1 is a side elevation of my improved wheel with the fairing plates removed.

Fig. 2 is a vertical section taken centrally through the wheel shown in Fig. 1 with the fairing plates in place.

Fig. 3 is an enlarged fragmentary sectional view showing the connection between the spokes and rim.

Fig. 4 is an enlarged more or less diagrammatic view showing the connection between the spokes and the hub.

Fig. 5 is a sectional view taken on the line 5—5 of Fig. 4.

Figure 1:
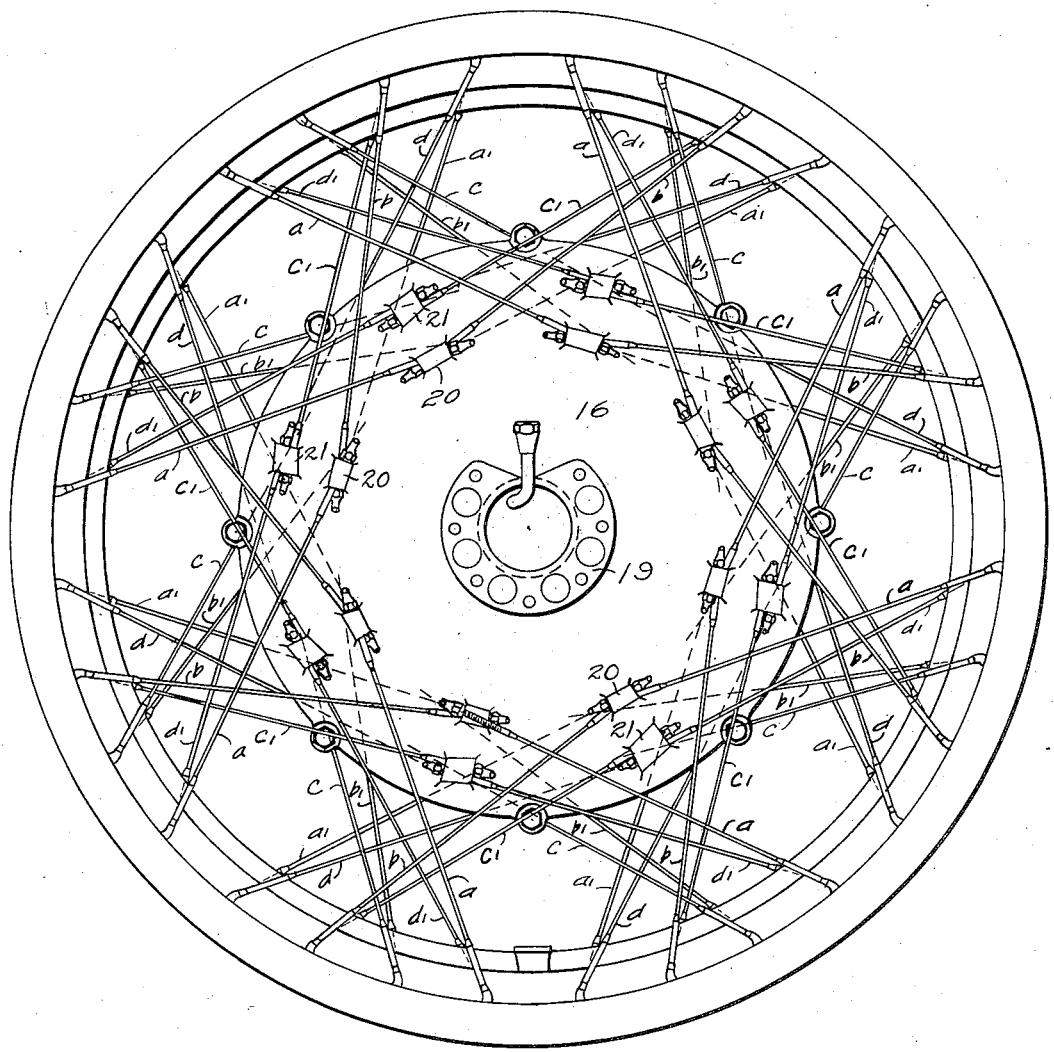

The wheel herein shown and described is adapted for any use for which a wheel may be employed, but is particularly adaptable for use in connection with motor vehicles and aircraft, and particularly the latter because of its relatively light weight and relatively great strength especially as respects its ability to withstand lateral impact forces on the wheel. While the construction of the rim or of the hub is relatively unimportant as far as the broader aspects of the present invention are concerned, so long as the same are constructed to take full advantage of the novel method of lacing the spokes, I have shown in the accompanying drawings a rim of novel design particularly adapted for realizing the maximum advantages of the present invention and which forms the subject matter of a separate patent application for improvements in Rims filed July 17, 1929, Serial No. 379,669. The particular hub structure shown serves the dual purpose of a hub and a brake drum for a braking mechanism of novel construction (not shown) also forming the subject matter of a separate patent application filed on even date herewith.

Referring to the drawings, the rim is shown as being of the drop center construction and made up of two halves 10 and 11, each half having a radially inwardly extending flange 12, which flanges abut against each other and are maintained in assembled relation by means of a U-sectioned ring 13 enclosing the flanges 12 and clamping them together so as to prevent both axial and radial movement of the flanges with respect to each other. The rim halves 10 and 11 are perfectly formed of sheet metal and their outer margins are reversely bent back upon themselves as at 14 to form a double thickness base, where apertured to provide an annular row of spoke openings and a tubular marginal bead 15. The hub illustrated comprises two outwardly convex main parts 16 and 17 of cup-like construction each providing a substantially conical area and secured together at their open sides, and preferably in a median plane to form an enclosing casing for brake mechanism (not shown) mounted therein, the halves 16 and 17 serving in this case as brake drums for the brake mechanism as well as the hub for the wheel. A stub or other shaft 18 having an attached flange 19 is rotatably supported within the hub in a suitable manner.

In accordance with the present invention the rim and the hub are connected together in the following manner. Each of the hub members 16 and 17 has formed thereon, and preferably on the conical area thereof, two annular series of spoke-receiving means such as lugs 20 and 21, each series being arranged concentrically with respect to the axis of the wheel and the series 20 being arranged radially inwardly and axially outwardly of the series 21. Each of the lugs 20 and 21 is preferably adapted to anchor the inner ends of two of the wire spokes connecting the rim to the hub. There are thus provided in effect, four separate series of wire spokes, one corresponding to each of the series of lugs on each side of the hub; and even the inner series of lugs are shown as laterally spaced more widely than the mentioned rows of rim apertures. One series comprises the spokes $a$ and $b$, which extend from each lug 20 on the near side of the hub, as viewed in Fig. 1, to the near side of the rim as viewed in Fig. 1. These spokes $a$ and $b$ extend from each lug 20 in opposite directions and in a direction substantially tangent to that point of the hub to which the corresponding lug 20 is formed; and they are hereinafter referred to as "mutually complemental" for the reason that, as shown, an "$a$" spoke and a "$b$" spoke cooperate to complete what amounts to a chord,—although the tension of each spoke in each chord is separately adjustable by a special nut.

On the opposite side of the wheel as viewed in Fig. 1, corresponding spokes $a_1$ and $b_1$ extend from the lugs 20 on the opposite side of the hub, in opposite directions, to the opposite side of the rim. The lugs 20 on one side of the hub are slightly spaced circumferentially of the hub from the lugs 20 on the opposite side of the hub so that the points where the spokes join the hub in the finished wheel will be equally spaced around the circumference of the rim.

It will be apparent that as thus far described two series of spokes have been provided, one on each side of the central plane of the wheel and each comprising series of oppositely extending spokes joining the hub on one side of the central plane of the wheel with the rim on the same side of the central plane of the wheel.

However, both spokes constituting a pair of spokes which outwardly terminate in a common radial plane may be secured to lugs in another radial plane and on the same convex hub member,—so that the other two series of spokes cross the central or median plane of the wheel to connect the lugs 21 with the rim. As viewed in Fig. 1, one of these series comprises the spokes $c_1$ and $d_1$ whose inner ends are anchored in the corresponding lugs 21 and extend outwardly therefrom in opposite directions to the rim. These spokes, $c_1$ and $d_1$ as viewed in Fig. 1 extend from the lugs 21 on the near side of the wheel to the rim on the opposite side of the wheel and are connected to the rim in the same plane as the spokes $a_1$ and $b_1$ are connected thereto. These spokes, $c_1$ and $d_1$, therefore extend across the central plane of the wheel in connecting the hub to the rim.

The remaining series of spokes, $c$ and $d$, connect the lugs 21 on the far side of the wheel as viewed in Fig. 1 to the rim on the near side of the wheel as viewed in Fig. 1. This series of spokes therefore also extends across the central plane of the wheel. Referring to spokes which outwardly terminate in a common radial plane as constituting an inwardly divergent "pair", four pairs of spokes (peripherally successive pairs being alternately connected with the respective conical parts) will be seen preferably to inwardly terminate in a common intermediate plane; and each spoke, as viewed in side elevation, will appear as intersected by eight other spokes,—inclined oppositely thereto in groups of four.

The first two series of mutually supplemental spokes, $a$ and $b$ and $a_1$ and $b_1$, preferably extend from the lugs 20 outwardly at a slight inclination towards the central plane of the wheel. Thus, it will be apparent that with this construction any lateral displacement of the hub relative to the rim is resisted by tension of all the spokes in two of the series of spokes, one of which series extends through the central plane of the wheel and therefore is in a position to withstand such lateral displacement with the minimum of stresses set up within such spokes themselves, and that regardless of the direction of the tendency towards lateral displacement such tendency is equally resisted by the series affected thereby. It will also be apparent that due to the widely divergent direction of each set of spokes of each series that any tendency towards radial displacement of the hub relative to the rim is resisted by a maximum number of the spokes in the series, and that all of the spokes may be subjected to like stresses. In fact, with the construction illustrated the fatigue distribution on the spokes is dissipated through not less than 300° of the total circumference of the wheel, or by 83% of the number of spokes. Furthermore, by the tangential arrangement of the spokes relative to the hub, any tendency of rotational or tortional movement of the hub relative to the rim is resisted by forces acting in the length of the spokes, thereby permitting the spokes to exert the greatest amount of resistance to such movement with the minimum of internal stresses. This construction results in a wheel having great elasticity torsionally, laterally and transversely, resulting in a wheel of great resiliency and flexibility without sacrificing the strength in any respect whatsoever.

This result can be readily understood by a comparison of the disclosures of Figs. 1 and 2. From Fig. 2 is will be noted that the hub itself has a particular conformation, being hollow, as heretofore pointed out to receive the brake mechanism, but having an external conformation in which the diameter of the hub, at the mid-plane of the wheel, is greatest at such mid-plane, and being symmetrical on opposite sides of such mid-plane; the opposite sides decrease in diameter progressively away from such mid-plane, giving what has been termed a somewhat bowl shape to the hub. The lugs 20 and 21 are arranged in two annular series on each side of the mid-plane, with the lugs of each series extending on a plane parallel with such mid-plane, and since the series are spaced apart, the planes of the series are also spaced from each other.

In locating the lugs or anchoring devices 20 and 21, it will be noted that the lugs 20 and 21 of a side of the hub are arranged substantially on the same radius of the hub. Since the diameter of the two series differs because of the hub conformation, it will be understood that this arrangement provides for an equal number of lugs 20 and 21 in the two series, but with the lugs 21 spaced angularly a greater distance than those of lugs 20.

Referring to the rim ends of the spokes, it will be noted from Figs. 2 and 3, that the spoke connections with the rim are located in two annular series, one on each side of the mid-plane of the wheel, the particular showing presenting a symmetrical arrangement. As indicated in Fig. 2, the plane of either series of spoke connections with the rim is spaced from the mid-plane of the wheel a distance less than the distance of the plane of the inner series of lugs 21 from such mid-plane. And from the showing of Fig. 1, it will be noted, that the spoke connections with the rim present the connections of the two series as arranged in pairs, in that two of the connections are located on substantially the same radial plane but on opposite sides of the mid-plane of the wheel; and it will be noted that the spokes which are connected with the rim to form such pair, are spokes which lead from one side of the mid-plane, and are spokes which lead from lugs 20 and 21 which have the radial alinement referred to. In addition, the arrangement is such that the spokes of the annular series of smaller hub diameter lead to the rim series on the same side of the mid-plane as the lugs, while the spokes of the other annular series of larger diameter lead to the rim series on the opposite side of the mid-plane, and thus cross the mid-plane of the wheel.

Because of the relative dimensions referred to, the arrangement tends to permit use of spokes of approximately similar length, thus providing an advantage in structure. But the greater advantage of the arrangement as thus far pointed out, lies in the fact that the relation of the hub series with respect to the rim series is such that no spoke extends truly normal to the wheel axis, and that all spokes lead in directions toward the mid-plane rather than in such normal direction, the result being that on any lateral thrust effect, as when skidding or rounding a turn, the spokes from the opposite side of the hub are presenting direct resistance to the lateral shift of the rim relative to the hub. And although the lugs of the series on one side of the mid-plane of the hub are not directly opposite the similar lugs of the series of the opposite side of such plane—the series having a staggered relation as indicated in Fig. 1, since the pair of rim connections of the spokes from one side of the hub lead to a different point in the rim series from those of the opposite side of the hub—the effect remains the same, since the rim connections of the two pairs form adjacent pairs of the rim series, so that the angular off-set of the two sides does not materially change the conditions excepting to tend to broaden the zone of the stress resistance action.

This is understood from the fact that the spokes which are receiving the stress by compression are in the vicinity of the spokes which are being placed under tension, both with respect to the hub and the rim, the stresses being thus placed concurrently in an angular zone of some length even though the stress were confined to but four spokes; in practice, the stress is made active over a large length angularly, the illustration noted indicating the characteristics in each section of this length.

In addition to the above general characteristics of the arrangement of the spokes, one other general characteristic is present. As will be noted, the spokes from a pair of lugs 20 and 21 lead in a direction approaching a perpendicular to the radial plane of such pair of lugs. The two spokes of such pair do not extend parallel to each other—the lugs of the pair have different radial distances from the wheel axis, so that the lead is from spaced points radially while the rim ends are opposite one another on substantially the same radial plane—and neither is actually perpendicular to the radial plane of the lugs, but both approach such arrangement, the spokes which cross the mid-plane providing the nearer approach.

As a result, none of the spokes of the wheel extend radially of the wheel, and none of them extend parallel to such a radius of the wheel, so far as the present disclosure is concerned. It might be possible that with a different number of pairs of lugs from that shown, the lacing presented might present some spoke which might be parallel with some radius of the wheel, and thus affect the second statement made to such extent, but it would be of limited extent, and more or less accidental. However, the first statement will present the conditions present, and will indicate somewhat of the effect produced, the showing of Fig. 1 indicating the appearance under the conditions shown.

As will be seen from Fig. 1, the effect of the lacing is generally similar to that above pointed out with respect to lateral stresses, when the arrangement is considered in connection with radial stresses. For instance, in Fig. 1, if we consider the upper zone of four pairs of spokes relative to a vertical radius passing through the center of such zone, practically all of the spokes of the zone will tend in the direction of such radius, those on one side of the radius tending opposite to those of the other side of such radius. As a result, the stresses are not communicated radially but are carried laterally to bring in distributed effects in a number of directions, so that the distribution of stress conditions presents characteristics of which the percentage above indicated is illustrative.

The advantage of the arrangement lies in the fact that this efficient result is obtainable with a minimum number of spokes. In the form shown in Fig. 1, each side of the hub carries eight pairs of lugs, with the pairs spaced at equal angular distances. Since each lug carries two spokes, it will be understood that sixty-four spokes are utilized with the rim series presenting thirty-two spokes in each series, also spaced substantially equally angularly. While this number of spokes is utilized, the arrangement is such as to permit ready assemblage and adjustment as well as substitution.

It will be understood, of course, that the conditions to be met by the present wheel differ materially from normal wheel practice. The hub forms the external casing for a brake mechanism located therein, with the inclined walls of the hub carrying internal braking surfaces. Because of this condition, the wheel is subjected to stresses set up by the application of the brakes tending to set up torsional stresses of large value in addition to the normal driving stresses. And in meeting these, the presence of the spoke direction which approaches the perpendicular to the radial plane of the lugs to which the inner ends of the spokes are secured is of material advantage.

Although in the broader aspects of the present invention the particular method of securing the spokes in place is more or less unimportant, the particular method of securing the spokes in place shown constitutes a further part of the present invention. Contrary to conventional practice, the flanged ends of the spokes in the present case are anchored in the rim. When the particular rim construction shown is employed the flanged ends of the spokes are preferably anchored in cup-shaped recesses such as 25 formed in the double thickness portion of the rim thereby locking the reversely bent portion 14 of the rim against displacement relative to the co-operating portion, and furnishing a solid support for the spokes. The inner ends of the spokes extend through suitable apertures provided for them in the lugs 20 and 21 as best shown in Figs. 4 and 5. On the free end of each spoke which projects through the corresponding lug 20 or 21, and which projecting end is threaded, is received an independent tensioning nut member 26. Each of the nut members 26 is preferably provided with both a non-circular wrench-receiving portion and a tapered end portion 27 which is received in the complementary tapered socket 28 formed in the corresponding lug 20 or 21. The angle of the portion 27 and the socket 28 is preferably such a wedge fit as to firmly lock the nuts 26 against possible loosening in service.

The advantage of this method of securing the spokes in place is that the nuts 26 are more readily accessible to adjustment in manufacture and in service than in the conventional type.

As illustrated in Fig. 2, fairing plates or discs such as 29 and 30 may be provided for the sides of the wheel where desired and such plates may be secured in place by any suitable means, that shown comprising screws 31 extending through each plate 29 or 30 and threading into lugs such as 32 provided on the corresponding hub member 16 or 17.

Formal changes may be made in the specific embodiment of the invention described without departing from the spirit and substance of the broad invention, the scope of which is commensurate with the appended claims.

What I claim is:

1. In tension wheels and in combination, a hollow hub formation, a rim, and spokes connecting the hub and rim, said hub formation having its walls symmetrical relative to the mid-plane of the wheel and having its zone of greatest diameter at such mid-plane and with the diameter decreasing progressively away from such plane, said hub formation having two annular series of spoke-anchoring devices on each side of such mid-plane with the spoke-anchoring devices of each series located on a plane individual to the series and with the several planes extending substantially parallel with and spaced from such mid-plane and relative to each other to thereby locate the respective planes of the two series of spoke-anchoring devices located at each side of such mid-plane as differing in remoteness from such mid-plane, an anchoring device of the more remote series being spaced from the axis of the hub a less distance radially than a similar device of the adjacent series of such side, a spoke-anchoring device of each series located at one side of the mid-plane being positioned on approximately the same radial plane of the wheel as a spoke-anchoring device of the other series on the same side of the mid-plane to provide a pair of devices on said approximate radial plane at one side of such mid-plane, said rim having its spoke connections arranged in two annular series symmetrical to and on opposite sides of such mid-plane with the spoke connections positioned to place a spoke connection of one series opposite the spoke connection of a spoke of the other series on a common radial plane of the wheel, a pair of spokes having such opposite connection relation with the rim leading from radially-alined anchoring devices of the hub at one side of the wheel mid-plane.

2. A wheel as in claim 1 characterized in that the anchoring device for a spoke and the point of connection of the latter with the rim are relatively located to place the spoke length as approaching a perpendicular to the radial plane on which the device is located, the spoke of the other of the pair of devices having its spoke length extending at an acute angle to the first-named spoke when viewed from the side of the wheel.

3. A wheel as in claim 1 characterized in that the radially-alined anchoring devices of the hub-formation and the laterally-alined points of connection of the spokes connected with said devices are relatively positioned to place the respective spoke lengths as approaching a perpendicular to the radial plane of the devices with the direction of length of one spoke of greater angularity to said perpendicular than the direction of length of the other spoke.

4. A wheel as in claim 1 characterized in that the radial planes of the anchoring devices at one side of the mid-plane of the hub are off-set angularly relative to the similar devices on the opposite side of such mid-plane.

5. A wheel as in claim 1 characterized in that the respective radial planes of the series of anchoring devices are equi-spaced angularly of the hub, with the radial planes of the series of one side of the mid-plane of the wheel off-set angularly relative to the radial planes of the series of devices at the other side of such mid-plane.

6. A wheel as in claim 1 characterized in that the distance between the plane of a series of spoke connections with the rim and the mid-plane of the wheel is less than the distance between such mid-plane and the plane of any of the annular series of anchoring devices.

7. A wheel as in claim 1 characterized in that the lead of the spoke length of each spoke from its anchoring device is in the direction of the mid-plane of the wheel, with the rim end of the spoke spaced from such mid-plane with the rim ends of the spokes from such radially-alined pair of devices located on different sides of such mid-plane.

8. A wheel as in claim 1 characterized in that the radial planes of the anchoring devices at one side of the mid-plane of the hub are off-set angularly relative to the similar devices on the opposite side of such mid-plane, the spoke connections with the rim of similar spokes of a pair of devices on one side being located as the succeeding pair of connections in the rim series with respect to the similar spokes of the off-set devices of the opposite side of the mid-plane of the hub.

9. A wheel as in claim 1 characterized in that the anchoring device for a spoke and the point of connection of the latter with the rim are relatively located to place the spoke length as approaching a perpendicular to the radial plane on which the device is located, each device being arranged to anchor a pair of spokes, the second spoke of the pair leading from the device in a direction opposite that of the first spoke relative to such radial plane, the spokes of the pair extending substantially symmetrical with respect to such plane, with the rim end of the spoke spaced from the mid-plane of the wheel.

10. A wheel as in claim 1 characterized in that the spokes of the outer annular series of the opposite sides of the mid plane have their opposite spoke ends connected in the rim series corresponding to the side of the mid-plane on which the spoke-anchoring device is located, the spokes of the corresponding inner series being connected with the rim series of the side of the mid-plane opposite that on which said device is located, whereby the spokes of the inner series cross the mid-plane, the distances of the planes of the respective annular series of hub and rim from the mid-plane being arranged to cause each spoke to lead in the direction of such mid-plane.

CLAUDE SAUZEDDE.